United States Patent
Yang et al.

(10) Patent No.: US 10,097,830 B2
(45) Date of Patent: Oct. 9, 2018

(54) ENCODING DEVICE WITH FLICKER REDUCTION

(71) Applicant: SAMSUNG ELECTRONICS CO., LTD., Suwon-si, Gyeonggi-do (KR)

(72) Inventors: Jung Yeop Yang, Seoul (KR); Hyuk Jae Jang, Suwon-si (KR)

(73) Assignee: SAMSUNG ELECTRONICS CO., LTD., Suwon-si, Gyeonggi-Do (KR)

( * ) Notice: Subject to any disclaimer, the term of this patent is extended or adjusted under 35 U.S.C. 154(b) by 236 days.

(21) Appl. No.: 15/004,362

(22) Filed: Jan. 22, 2016

(65) Prior Publication Data

US 2016/0286214 A1 Sep. 29, 2016

(30) Foreign Application Priority Data

Mar. 23, 2015 (KR) .................. 10-2015-0040144

(51) Int. Cl.
*H04N 19/124* (2014.01)
*H04N 19/18* (2014.01)
*H04N 19/176* (2014.01)

(52) U.S. Cl.
CPC ......... *H04N 19/124* (2014.11); *H04N 19/176* (2014.11); *H04N 19/18* (2014.11)

(58) Field of Classification Search
CPC .... H04N 19/124; H04N 19/176; H04N 19/18; H04N 5/2357
See application file for complete search history.

(56) References Cited

U.S. PATENT DOCUMENTS

| | | | |
|---|---|---|---|
| 7,142,722 B2 | 11/2006 | Fukuhara et al. | |
| 7,263,124 B2 | 8/2007 | Peng et al. | |
| 7,697,763 B2 | 4/2010 | Lo | |
| 8,036,270 B2 | 10/2011 | Zhao et al. | |
| 8,325,799 B2 | 12/2012 | Chono et al. | |
| 8,411,742 B2 | 4/2013 | Yang et al. | |
| 8,582,645 B2 | 11/2013 | Mathew et al. | |
| 2005/0207660 A1* | 9/2005 | Edgar ................. | H04N 19/61 382/232 |
| 2007/0036213 A1* | 2/2007 | Matsumura .......... | H04N 19/139 375/240.03 |
| 2009/0257489 A1 | 10/2009 | Karczewicz et al. | |
| 2011/0075729 A1* | 3/2011 | Dane ................... | H04N 19/15 375/240.03 |

(Continued)

FOREIGN PATENT DOCUMENTS

| | | |
|---|---|---|
| JP | 2005-323315 | 11/2005 |
| KR | 1020050037095 | 4/2005 |

*Primary Examiner* — Behrooz Senfi
(74) *Attorney, Agent, or Firm* — F. Chau & Associates, LLC

(57) ABSTRACT

In an application processor having an encoder configured to reduce flicker occurring in a display, the encoder includes a transformer configured to generate first frequency domain coefficients for individual block values of a current frame, a quantizer configured to quantize the first frequency domain coefficients to generate quantized coefficients, and a coefficient calculator configured to generate first adjusting coefficients for reducing the flicker, where the quantizer is configured to adjust the quantization coefficients based on the first adjusting coefficients and output adjusted quantization coefficients.

19 Claims, 14 Drawing Sheets

(56) References Cited

U.S. PATENT DOCUMENTS

| | | | | |
|---|---|---|---|---|
| 2011/0255597 A1* | 10/2011 | Mihara | ............... | H04N 19/176 375/240.16 |
| 2014/0037223 A1 | 2/2014 | Jiang et al. | | |
| 2015/0207975 A1* | 7/2015 | Nguyen | ............... | H04N 5/2357 348/228.1 |

* cited by examiner

FIG. 4B

| 0 | 0 | 0  | 0  |
|---|---|----|----|
| 0 | 0 | 0  | 0  |
| 0 | 0 | 86 | 87 |
| 0 | 0 | 88 | 89 |

T[f$_{t-1}$(n)]

| 0 | 0 | 0  | 0  |
|---|---|----|----|
| 0 | 0 | 0  | 0  |
| 0 | 0 | 94 | 93 |
| 0 | 0 | 92 | 91 |

T[f$_t$(n)]

$Q[T[f_{t-1}(n)]] = 89 \div 20 = 4.45 \approx 4$
$Q[T[f_t(n)]] = 91 \div 20 = 4.55 \approx 5$

FIG. 4C $$E = \sum_{n=0}^{N-1} T[\hat{e}_t(n)]$$

$$= \sum_{n=0}^{N-1} |T[\hat{f}_t(n)] - T[\hat{f}_{t-1}(n)]|$$

$$= \sum_{n=0}^{N-1} |Q^{-1}[Q[T[f_t(n)]] + x(n)] - T[\hat{f}_{t-1}(n)]|$$

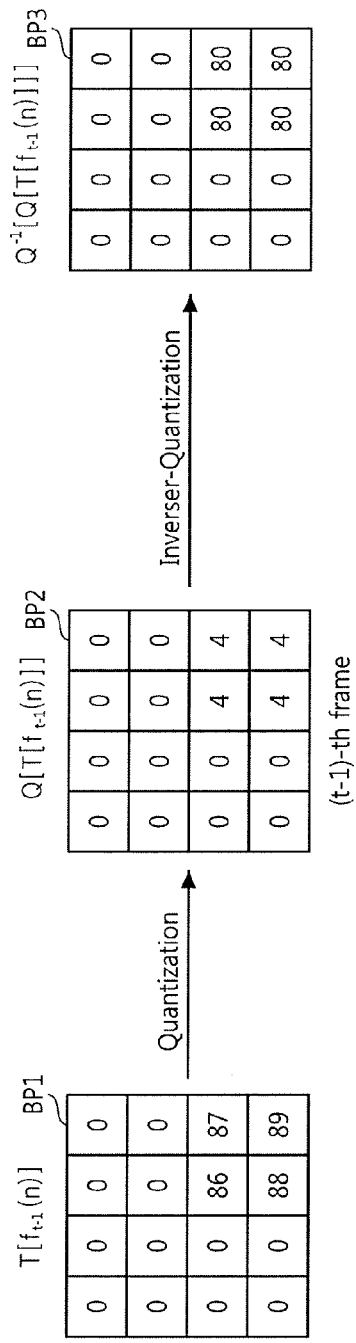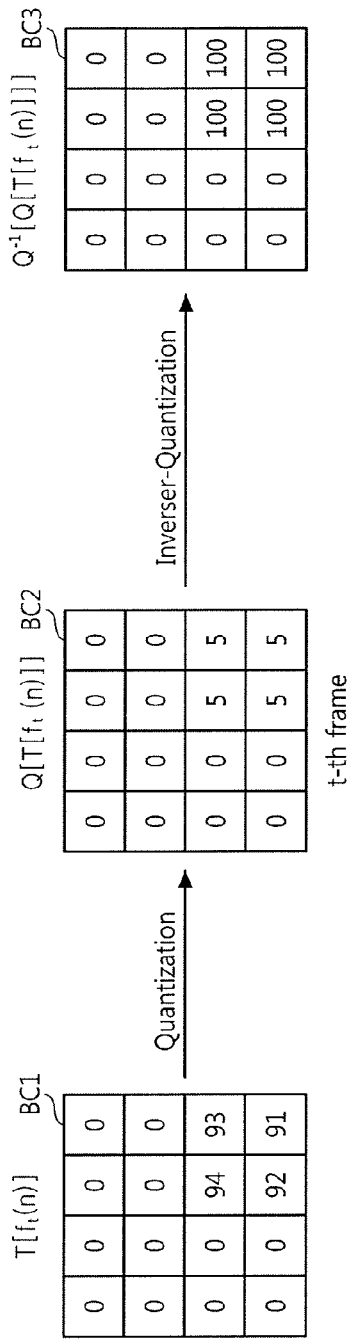

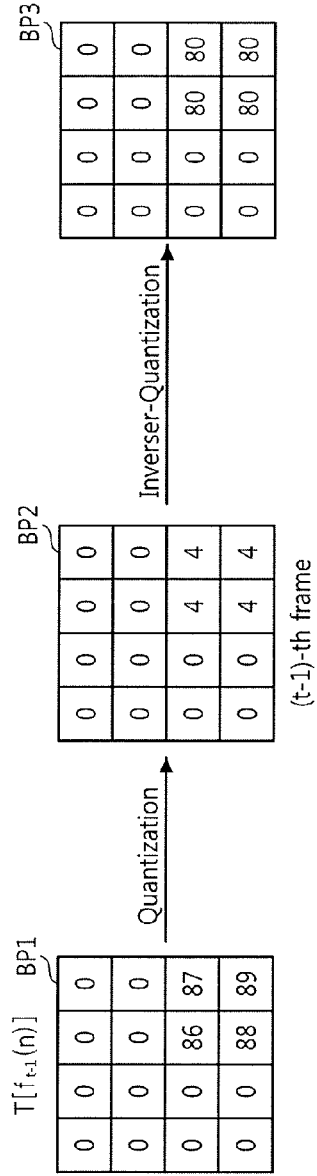
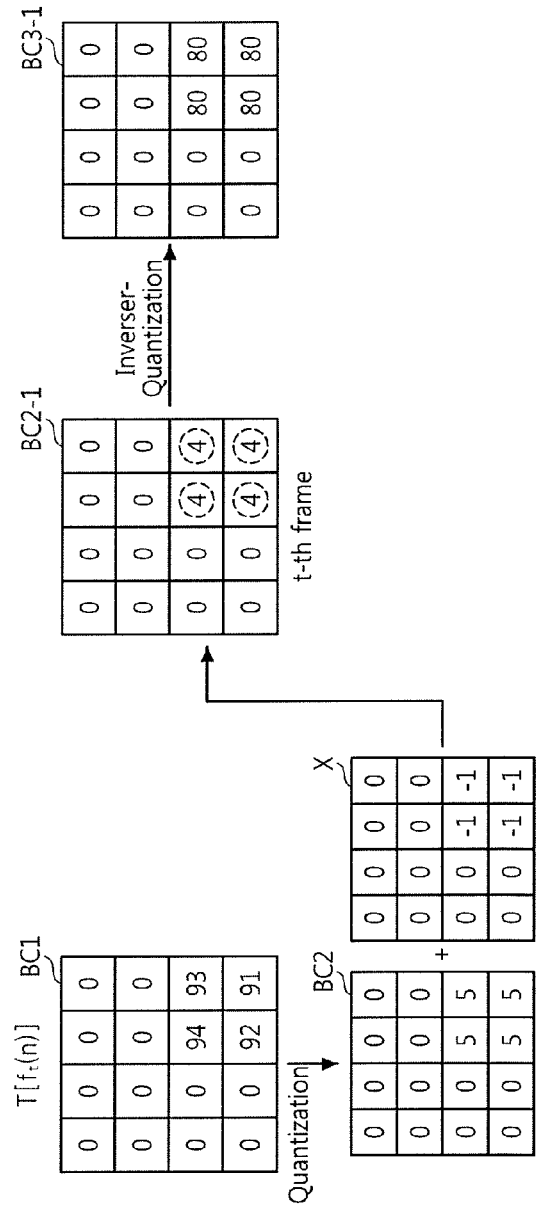

ENCODING DEVICE WITH FLICKER REDUCTION

CROSS-REFERENCE TO RELATED APPLICATION

This application claims priority under 35 U.S.C. § 119(a) (post-PLT) to Korean Patent Application No. 10-2015-0040144, which was filed on Mar. 23, 2015 in the Korean Intellectual Property Office, the disclosure of which is hereby incorporated by reference in its entirety.

BACKGROUND

The present inventive concept relates to encoders, and more particularly, to encoders for reducing flicker.

In image processing, flicker or flickering may be observed in a current frame when its image information diverges unexpectedly from that in a previous frame. For successive frames, a human's visual system may respond more sensitively to flickering that occurs in a background domain including a non-moving object than to flickering that occurs in a domain including a moving object.

SUMMARY

Exemplary embodiments of the present inventive concept relate to encoders, and more particularly, to encoders for adapting quantization coefficients using information from a previous frame and information from a current frame to reduce flicker.

An exemplary embodiment of the present inventive concept is directed to an application processor having an encoder for reducing flicker occurring in a display, in which the encoder includes a transformer configured to generate first frequency domain coefficients for individual or $k^{th}$ block values of a current frame, a quantizer configured to quantize the first frequency domain coefficients to generate quantized coefficients, and a coefficient calculator configured to generate first adjusting coefficients for reducing the flicker. The quantizer is configured to adjust the quantization coefficients using the first adjusting coefficients and output the adjusted quantization coefficients.

This encoder may further include an inverse-quantizer, which is connected to the quantizer, where the transformer is configured to calculate second frequency domain coefficients for $k^{th}$ block values of a reconstructed previous frame, the inverse-quantizer is configured to inverse-quantize the adjusted quantization coefficients to generate inverse-quantized coefficients, and the coefficient calculator is configured to change at least one of the first adjusting coefficients using the inverse-quantized coefficients and the second frequency domain coefficients. Here, the current frame is a first I-frame, and a previous frame related to the reconstructed previous frame is a second I-frame or a P-frame.

This coefficient calculator may be configured to change the first adjusting coefficients so as to minimize an absolute value of a sum of differences between each of the inverse-quantized coefficients and each of the second frequency domain coefficients.

Each of these first adjusting coefficients may include at least a portion of these second adjusting coefficients in that each of the second adjusting coefficients includes a plurality of elements, and each of the first adjusting coefficients includes a corresponding one of the plurality of elements.

This coefficient calculator may be configured to generate at least a portion of the second adjusting coefficients for the first adjusting coefficients using a zig-zag scanning method.

Another exemplary embodiment of the present inventive concept is directed to a data processing system, including a display and an application processor configured to control the display. The application processor includes an encoder configured to reduce flicker occurring in the display, and the encoder includes a transformer configured to generate first frequency domain coefficients for $k^{th}$ block values of a current frame, a quantizer configured to quantize the first frequency domain coefficients to generate quantized coefficients, and a coefficient calculator configured to generate first adjusting coefficients for reducing the flicker. The quantizer is configured to adjust the quantization coefficients and output adjusted quantization coefficients using the first adjusting coefficients.

This encoder may further include an inverse-quantizer that is connected to the quantizer, where the transformer is configured to calculate second frequency domain coefficients for $k^{th}$ block values of a reconstructed previous frame, the inverse-quantizer is configured to inverse-quantize the adjusted quantization coefficients to generate inverse-quantized coefficients, and the coefficient calculator is configured to change at least one of the first adjusting coefficients using the inverse-quantized coefficients and the second frequency domain coefficients.

This data processing system may further include an imaging device connected to the application processor, a first serial interface connected between the application processor and the imaging device, and a second serial interface connected between the application processor and the display.

This data processing system may further include a memory connected to the application processor, where the application processor and the memory are packaged in a package on package (PoP) or a system-in-package (SiP).

In yet another exemplary embodiment, an application processor having an encoder for reducing flicker on a display includes a transformer configured to generate frequency domain coefficients for individual blocks of a current frame, a quantizer connected to the transformer and configured to quantize the frequency domain coefficients and generate quantized coefficients, an inverse-quantizer connected to the quantizer, and a mode decision unit connected to the inverse-quantizer and configured to select spatial-domain prediction blocks based on a cost function to optimize rate-distortion, where the transformer is connected to the mode decision unit and configured to calculate the frequency domain coefficients for reconstructed previous blocks responsive to the selected spatial-domain prediction blocks to reduce flicker.

This application processor's mode decision unit may include a quantization coefficient adjusting unit configured to calculate a flickering score value, and a calculation unit configured to calculate a cost function value.

This application processor's mode decision unit may be configured to select spatial-domain prediction blocks to minimize an absolute value of a sum of differences between inverse-quantized coefficients and frequency domain coefficients.

This application processor's mode decision unit is configured to select spatial-domain prediction blocks based on a LaGrangian cost function.

This application processor's mode decision unit may be configured to select spatial-domain prediction blocks responsive to distortion between spatial-domain current block values of the spatial-domain current block and reconstructed block values of the reconstructed block, such that a selected block is responsive to a balancing of flickering and distortion.

BRIEF DESCRIPTION OF THE DRAWINGS

These and other aspects and advantages of the present inventive concept will become apparent and more readily appreciated from the following description of exemplary embodiments, taken in conjunction with the accompanying drawings, of which:

FIG. 4B is a conceptual diagram for an exemplary embodiment of frequency domain coefficients for the $k^{th}$ block of the previous frame and frequency domain coefficients for the $k^{th}$ block of the current frame.

FIG. 4C is a conceptual diagram that shows an equation for calculating a flickering-score according to an exemplary embodiment of the present inventive concept;

FIGS. 5A, 5B and 6 are conceptual diagrams that describe a case where flickering occurs in a current frame;

FIGS. 7A, 7B and 8 are conceptual diagrams that describe a method of adjusting quantization coefficients to remove flickering according to an exemplary embodiment of the present inventive concept;

DETAILED DESCRIPTION OF EXEMPLARY EMBODIMENTS

Figure 1A:
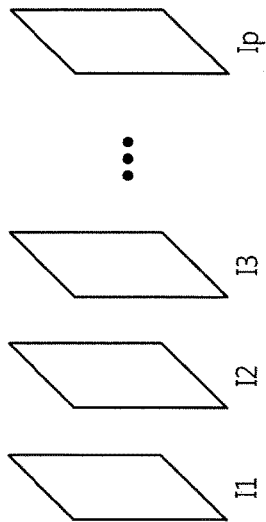
FIGS. 1A and 1B are conceptual diagrams showing image frame sequences in which flickering occurs in a background region.

Reference will now be made in detail to exemplary embodiments of the present inventive concept, examples of which are illustrated in the accompanying drawings wherein like reference numerals may refer to like elements throughout. These embodiments are described below in order to explain the present inventive concept with reference to the figures.

Figure 1B:
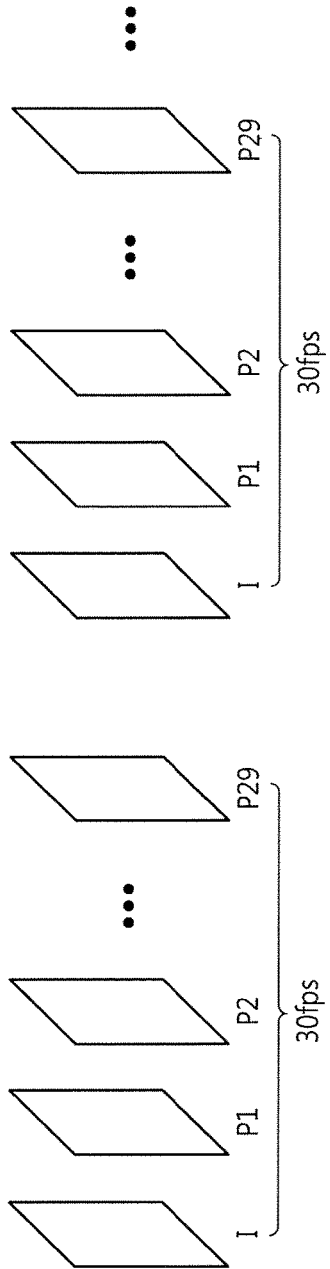

FIGS. 1A and 1B show image frame sequences in which flickering occurs in a background region. As shown in FIG. 1A, each frame I1 to Ip, where p is a natural number of two or more, is an intra frame (I-frame), and when a quantization parameter of each of the I-frames I1 to Ip is relatively large, flickering may occur in a background region of each of the successive I-frames I2 to Ip.

As shown in FIG. 1B, when frame sets including an I-frame I and predicted frames (P-frames) P1 to P29 are sequentially transmitted, flickering may occur in a background region of the I-frame I immediately following a P-frame P29. For example, in a device that processes a current frame and cannot use information from a previous frame, flickering may occur in a background region of the current frame. FIG. 1 shows examples in which flickering may occur in a background region; however, it is not limited thereto.

Figure 2:
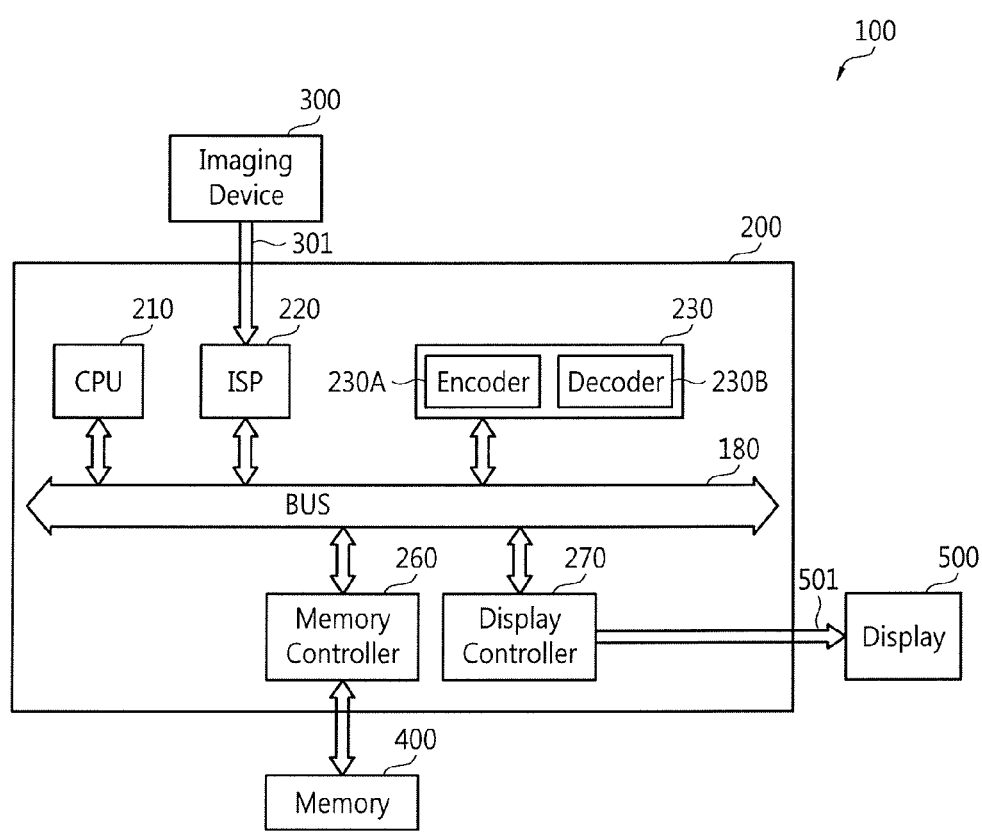
FIG. 2 is a schematic block diagram of a data processing system having an encoder according to an exemplary embodiment of the present inventive concept.

FIG. 2 is a block diagram of a data processing system according to an exemplary embodiment of the present inventive concept. Referring to FIG. 2, a data processing system 100 may include a controller 200, an imaging device 300 connected to the controller, a memory 400 connected to the controller, and a display 500 connected to the controller.

The data processing system 100 may be embodied in a personal computer (PC) or a mobile computing device, for example. The mobile computing device may be embodied in a laptop computer, a mobile phone, a smart phone, a tablet PC, a personal digital assistant (PDA), an enterprise digital assistant (EDA), a digital still camera, a digital video camera, a portable multimedia player (PMP), a personal navigation device or portable navigation device (PND), a handheld game console, a mobile internet device (MID), a wearable computer, an internet of things (IoT) device, an internet of everything (IoE) device, a drone, or an e-book, for example.

The controller 200 may be a control device that can control an operation of the imaging device 300, the memory 400, and the display 500. For example, the controller 200 may be embodied in an integrated circuit (IC), a motherboard, a system on chip (SoC), an application processor (AP), or a mobile AP; however, it is not limited thereto.

The exemplary controller 200 includes a bus 180, a central processing unit (CPU) 210 connected to the bus, an image signal processor (ISP) 220 connected to the bus, a multimedia processing device 230 connected to the bus, a memory controller 260 connected to the bus, and a display controller 270 connected to the bus.

The bus 180 may be embodied in an advanced microcontroller bus architecture (AMBA), an advanced high-performance bus (AHB), an advanced peripheral bus (APB), an advanced eXtensible interface (AXI), an AXI Coherency Extension (ACE), or an advanced system bus (ASB); however, the bus 180 is not limited thereto.

The CPU 210 may control an operation of the ISP 220, the multimedia processing device 230 that includes an encoder 230A and a decoder 230B, the memory controller 260, and the display controller 270 through the bus 180.

The ISP 220 may control format conversion of image data output from the imaging device 300, noise reduction of the image data, and/or image enhancement of the image data. The imaging device 300 may be a camera, a CMOS image sensor, a CMOS image sensor chip, or any device or devices that can generate image data.

For example, the ISP 220 may transform first image data having a first format output from the imaging device 300 into second image data having a second format to the bus 180. For example, the first format may be a Bayer format, and the second format may be a YUV format, a YCbCr format, or an RGB format; however, it is not limited thereto.

Although an exemplary embodiment in which the ISP 220 is embodied in the controller 200 is shown in FIG. 2, the ISP 220 may alternatively be embodied in an independent semiconductor chip disposed between the controller 200 and the imaging device 300 according to an alternate exemplary embodiment. In yet another alternate exemplary embodiment where the ISP 220 is disposed in the imaging device 300, a CMOS image sensor chip disposed in the imaging device 300 and the ISP 220 may be packaged in one package, e.g., a multi-chip package (MCP); however, the package type is not limited to such MCP.

The encoder 230A may generate quantization coefficients for an individual or $k^{th}$ block of a current frame or values of the $k^{th}$ block (that is, $k^{th}$ block values), and change the quantization coefficient for the $k^{th}$ block of the current frame using information from a $k^{th}$ block of a reconstructed previous frame and information from the $k^{th}$ block of the current frame. Thus, the encoder 230A may adjust quantization coefficients to reduce flicker that can occur in the display 500. For example, when a frame includes u*v blocks where each of u and v are natural numbers of two or more, a range of k may be $1 \leq k \leq u*v$. At this time, k may be a display order.

Figure 3:
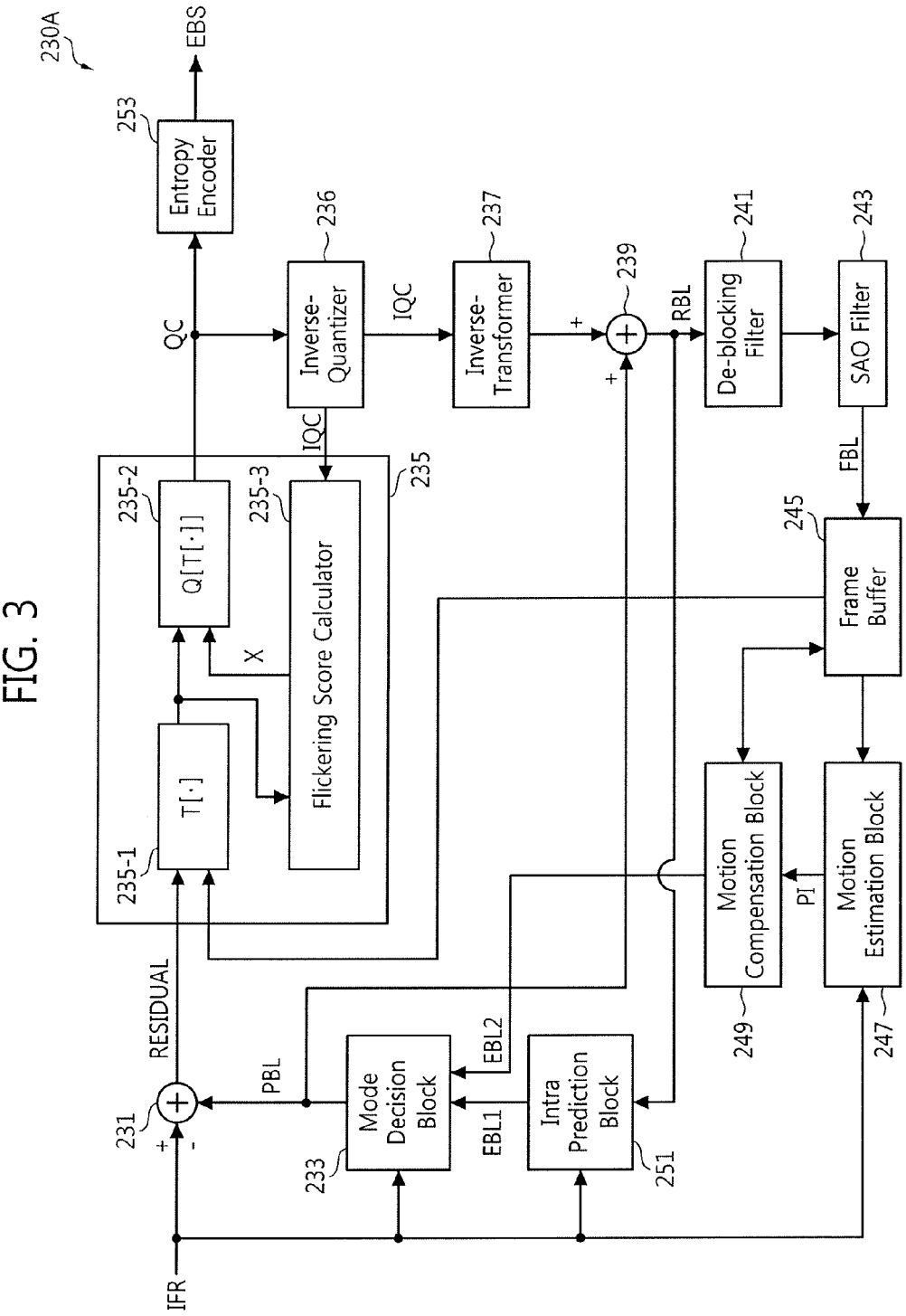
FIG. 3 is a schematic block diagram of an encoder, shown generally in FIG. 2, which can adjust quantization coefficients to remove flickering occurring in a display according to an exemplary embodiment of the present inventive concept.

Although the exemplary encoder 230A, which here supports a high efficiency video coding (HEVC) video compression standard, is shown in FIG. 3, alternate embodiments are contemplated. For example, the encoder 230A can adaptively change quantization coefficients for the $k^{th}$ block of the current frame using present technology for the present inventive concept, but is not limited thereto. That is, the information from the $k^{th}$ block of the reconstructed previous frame and the information from the $k^{th}$ block of the current frame are not limited to that of the block diagram including the configuration elements shown for descriptive purposes in FIG. 3.

The encoder 230A may receive image data output from the ISP 220, and encode the image data. The encoded image data (for example, an encoded bit-stream) may be stored in the memory 400 through the memory controller 260.

The memory controller 260 may read the encoded image data from the memory 400, and transmit the encoded image data to be read by the decoder 230B. The decoder 230B may decode the encoded image data transmitted from the memory controller 260, and the decoded image data may be transmitted to the display 500 through the display controller 270.

The multimedia processing device 230 may include the encoder 230A and the decoder 230B. For example, the multimedia device 230 may be embodied in a codec. The encoder 230A may perform a function of a compressor, and the decoder 230B may perform a function of a decompressor.

The memory controller 260 may control a data access operation on the memory 400 according to a control of the CPU 210. The data access operation may include a write operation of writing data in the memory 400 and a read operation of reading data from the memory 400.

The memory 400 may include a volatile memory and/or a non-volatile memory. The volatile memory may include a random access memory (RAM), a dynamic RAM (DRAM), a static RAM (SRAM), and/or a buffer memory, for example. The non-volatile memory may be embodied in a flash memory, a magnetic RAM (MRAM), a spin-transfer torque MRAM, a ferroelectric RAM (FeRAM), a phase change RAM (PRAM), and/or a resistive RAM (RRAM), for example. The flash memory may be embodied in a NAND-type flash memory or a NOR-type flash memory that stores one or more bits. For example, the controller 200 and the memory 400 may be packaged in a package on package (PoP) or a system-in-package (SiP).

The display controller 270 may transmit image data output from the CPU 210, the decoder 230B, or the display controller 270 to the display 500 under the control of the CPU 210.

The imaging device 300 may include a CMOS image sensor chip, which can generate image data. The CMOS image sensor chip may output image data corresponding to an optical image of a subject to the ISP 220. According to an exemplary embodiment, the imaging device 300 may output image data to the ISP 220 through the first serial interface 301, e.g., a Mobile Industry Processor Interface (MIPI) camera serial interface (CSI) 301.

The display 500 may display image data output from the display controller 270. The controller 200 may transmit image data to the display 500 through the second serial interface 501, e.g., a MIPI display serial interface (DSI) 501.

FIG. 3 is a schematic block diagram of an exemplary embodiment encoder, shown generally in FIG. 2, which can adjust quantization coefficients to reduce flickering occurring in a display.

Referring to FIG. 3, the encoder 230A may include a subtractor 231 configured to receive at least a portion of an input frame (IFR) signal on a non-inverting input, a mode decision block 233 configured to receive the IFR signal and connected to an inverting input of the subtractor, a quantization coefficient adjusting block 235 connected to an output of the subtractor, an inverse-quantizer 236 connected to an output of the quantization coefficient adjusting block and also connected to an input of the quantization coefficient adjusting block, an inverse-transformer 237 connected to an output of the inverse-quantizer, an adder 239 connected to an output of the inverse-transformer and connected to an output of the mode decision block 233, a de-blocking filter 241 connected to an output of the adder, a sample adaptive offset (SAO) filter 243 connected to an output of the de-blocking filter, a frame buffer 245 connected to an output of the SAO filter and connected to an input of the quantization coefficient adjusting block 235, a motion estimation block 247 connected to an output of the frame buffer and configured to receive the IFR signal, a motion compensation block 249 connected to an output of the motion estimation block and further connected in two-way communication with the frame buffer and connected to an input of the mode decision block 233, an intra prediction block 251 connected to an output of the adder 239 and configured to receive the IFR signal and providing an input to the mode decision block 233, and an entropy encoder 253 connected to an output of the quantization coefficient adjusting block 235 and configured to output an encoded bit-stream (EBS) signal. Here, blocks 233, 235, 247, 249, and 251 may be circuits or circuitries.

The subtractor 231 may calculate differences between values (hereinafter, referred to as "spatial-domain current block values") of a spatial-domain current block of an input frame (IFR), such as an intra frame block to be currently processed among a plurality of spatial-domain blocks included in the input frame, and values (hereinafter, referred to as "spatial-domain prediction block values") of a spatial-domain prediction block (PBL) output from the mode decision block 233, and generate values (hereinafter, referred to as "spatial-domain residual block values") of a spatial-domain residual block RESIDUAL corresponding to the calculated differences.

From a data processing viewpoint, a block may include m*n pixels. Here, each of m and n may be a natural number of two or more, and m need not be equal to n. Pixels included in the block are data having a YUV format, data having a YCbCr format, or data having a RGB format; however, it is not limited thereto. For example, the block may include 4*4 pixels, 4*8 pixels, 8*4 pixels, 8*8 pixels, 16*16 pixels, 32*32 pixels, or 64*64 pixels; however, a size of the block is not limited thereto.

The subtractor 231 may calculate differences on a calculation block basis, and output the calculated differences on a block basis. For example, a size of a calculation block may be smaller than a size of the block. For example, when the calculation block includes 4*4 pixels, the block may include 16*16 pixels; however, the size of the calculation block and the size of the block are not limited thereto.

The mode decision block 233 may receive an IFR spatial-domain current block, a first prediction block EBL1, an a second prediction block EBL2, and may output one of the first prediction block EBL1 or the second prediction block EBL2 as the spatial-domain prediction block PBL.

The quantization coefficient adjusting block 235 may generate quantization coefficients for a $k^{th}$ block of a current frame, and change the quantization coefficients using information on a $k^{th}$ block of a reconstructed previous frame and information from the $k^{th}$ block of the current frame.

The quantization coefficient adjusting block 235 may include a transformer 235-1, a quantizer 235-2, and a flickering-score calculator 235-3. The flickering-score calculator 235-3 may perform a function of a coefficient calculator that generates or changes adjusting coefficients X.

The transformer 235-1 may perform time-domain to frequency-domain transformation of spatial-domain residual block values included in the spatial-domain residual block RESIDUAL. For example, the transformer 235-1 may transform spatial coordinates of a time domain into a value of a frequency domain. For example, the transformer 235-1 may generate frequency domain coefficients from the spatial domain residual block values by using discrete cosine transform (DCT) or the like.

For example, the transformer 235-1 may receive values of the spatial-domain residual block RESIDUAL output from the subtractor 231 or the $k^{th}$ block of the reconstructed previous frame output from the frame buffer 245 as an input. The quantizer 235-2 may quantize frequency domain coefficients to generate quantized coefficients.

Figure 4A:
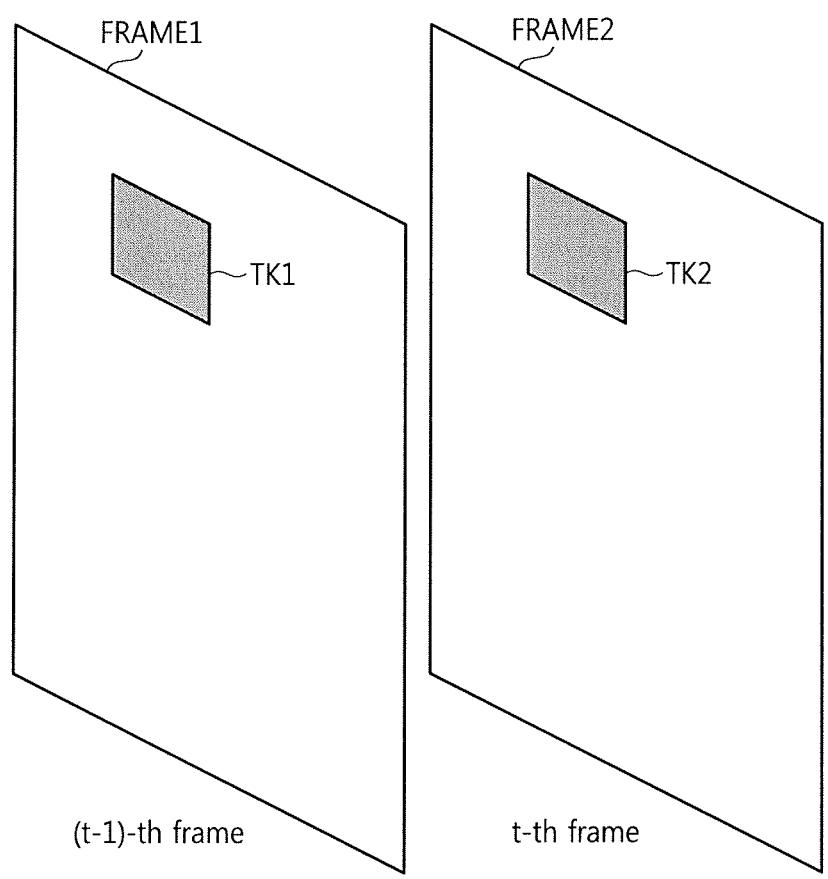
FIG. 4A is a conceptual diagram that shows a previous frame including a $k^{th}$ block and a current frame including a $k^{th}$ block.

FIG. 4A shows a previous frame FRAME1 including the $k^{th}$ block TK1 and a current frame FRAME2 including a $k^{th}$ block TK2, FIG. 4B shows an exemplary embodiment of frequency domain coefficients $T[f_{t-1}(n)]$ for a $k^{th}$ block TK1 of a previous frame FRAME1 and frequency domain coefficients $T[f_t(n)]$ for a $k^{th}$ block TK2 of a current frame FRAME2, and FIG. 4C shows an equation for calculating a flickering-score according to an exemplary embodiment of the present inventive concept.

The frequency domain coefficients $T[f_{t-1}(n)]$ and the frequency domain coefficients $T[f_t(n)]$ shown in FIG. 4B may be generated by the transformer 235-1. That is, the frequency domain coefficients $T[f_{t-1}(n)]$ are related to the $k^{th}$ block TK1 of the previous frame FRAME1, and the frequency domain coefficients $T[f_t(n)]$ are related to the $k^{th}$ block TK2 of the current frame FRAME2.

In an exemplary case where it is assumed that each of the $k^{th}$ blocks TK1 and TK2 of each of the frames FRAME1 and FRAME2 includes 4*4 pixels, the frequency domain coefficients $T[f_{t-1}(n)]$ for the $k^{th}$ block TK1 of the previous frame FRAME1 are 16, and the frequency domain coefficients $T[f_t(n)]$ for the $k^{th}$ block TK2 of the current frame FRAME2 are 16. At this time, a range of n is 0≤n≤(N−1), and when N is 16 (=4*4), the range of n is 0≤n≤15. Here, n for a first frequency domain coefficient is assumed to be "0".

Referring to FIG. 4C, $T[\hat{e}_t(n)]$ shows a frequency domain coefficient for an error value (or difference value) of a $n^{th}$ pixel included in a $k^{th}$ block of a reconstructed current frame, and $T[\hat{f}_t(n)]$ shows a frequency domain coefficient for the $n^{th}$ pixel included in the $k^{th}$ block of the reconstructed current frame (e.g., $t^{th}$ frame).

Figure 6:
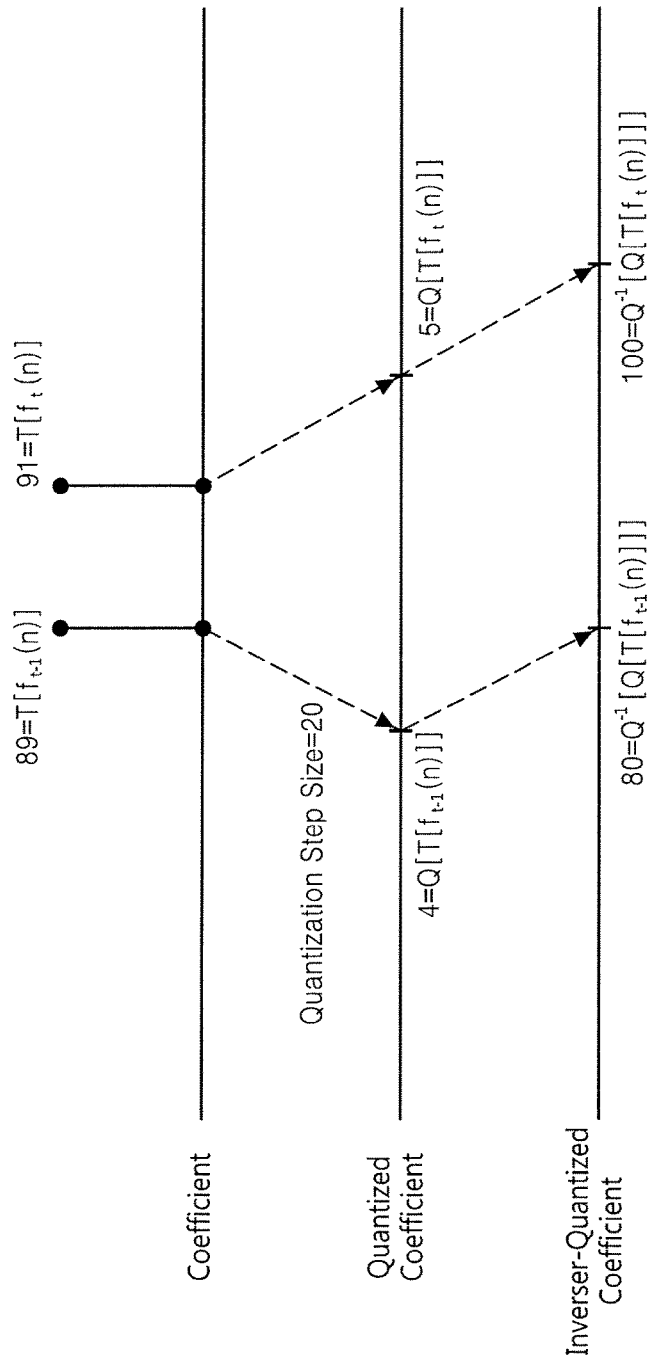

FIGS. 5A, 5B and 6 are conceptual diagrams that describe a case where flickering occurs in a current frame. For illustrative comparison purposes, the flickering score calculator 235-3 either does not operate or is not embodied in the encoder 230A, and each of the quantization step size and inverse-quantization step size are assumed to be 20.

Moreover, it is assumed that the quantizer 235-2 quantizes a frequency domain coefficient according to a rounding off to the nearest integer method or inclusive and exclusive reckoning, and outputs a quantized coefficient. However, the quantizer 235-2 may quantize a frequency domain coefficient using various methods and output a quantized coefficient.

As shown in FIGS. 4A, 4B, and FIG. 5A, frequency domain coefficients 86, 87, 88, and 89 of the frequency domain coefficients ($T[f_{t-1}(n)]$; BP1) for the $k^{th}$ block TK1 of the previous frame FRAME1, that is, $(t-1)^{th}$ frame, may be all quantized to 4 by the quantizer 235-2. A 4*4 matrix BP2 shows a matrix that includes coefficients quantized by the quantizer 235-2, and a 4*4 matrix BP3 shows a matrix that includes coefficients that are inverse-quantized by the inverse-quantizer 236.

As shown in FIGS. 4A, 4B, and FIG. 5B, frequency domain coefficients 94, 93, 92, and 91 of the frequency domain coefficients $T[f(n)]$; BC1) for the $k^{th}$ block TK2 of the current frame FRAME2, i.e., a $t^{th}$ frame, may be all quantized to 5 by the quantizer 235-2. A 4*4 matrix BC2 shows a matrix that includes coefficients quantized by the quantizer 235-2 and a 4*4 matrix BC3 shows a matrix that includes coefficients inverse-quantized by the inverse-quantizer 236.

Processes of quantizing and inverse-quantizing a sixteenth frequency domain coefficient 89 for the $k^{th}$ block TK1 of the $(t-1)^{th}$ frame FRAME1 and a sixteenth frequency domain coefficient 91 for the $k^{th}$ block TK2 of the $t^{th}$ frame FRAME2 are representatively described referring to FIGS. 4A, 4B, 5 and 6.

Here, it is assumed that the inverse-quantizer 236 generates an inverse-quantized coefficient by multiplying a quantized coefficient and a quantization step size (e.g., 20). Moreover, it is assumed that a quantized coefficient of the sixteenth frequency domain coefficient (89) for the $k^{th}$ block TK1 is 4, an inverse-quantized coefficient for the quantized coefficient (e.g., 4) is 80 (=4*20), a quantized coefficient of the sixteenth frequency domain coefficient 91 for the $k^{th}$ block TK2 is 5, and an inverse-quantized coefficient of the quantized coefficient (e.g., 5) is 100 (=5*20).

For example, if it is assumed that objectionable flickering occurs when a difference between the inverse-quantized coefficient for the $t^{th}$ frame FRAME2 and the inverse-quantized coefficient for the $(t-1)^{th}$ frame FRAME1 is 15 or more, flickering may occur at the $k^{th}$ block TK2 of the $t^{th}$ frame FRAME2.

Figure 8:
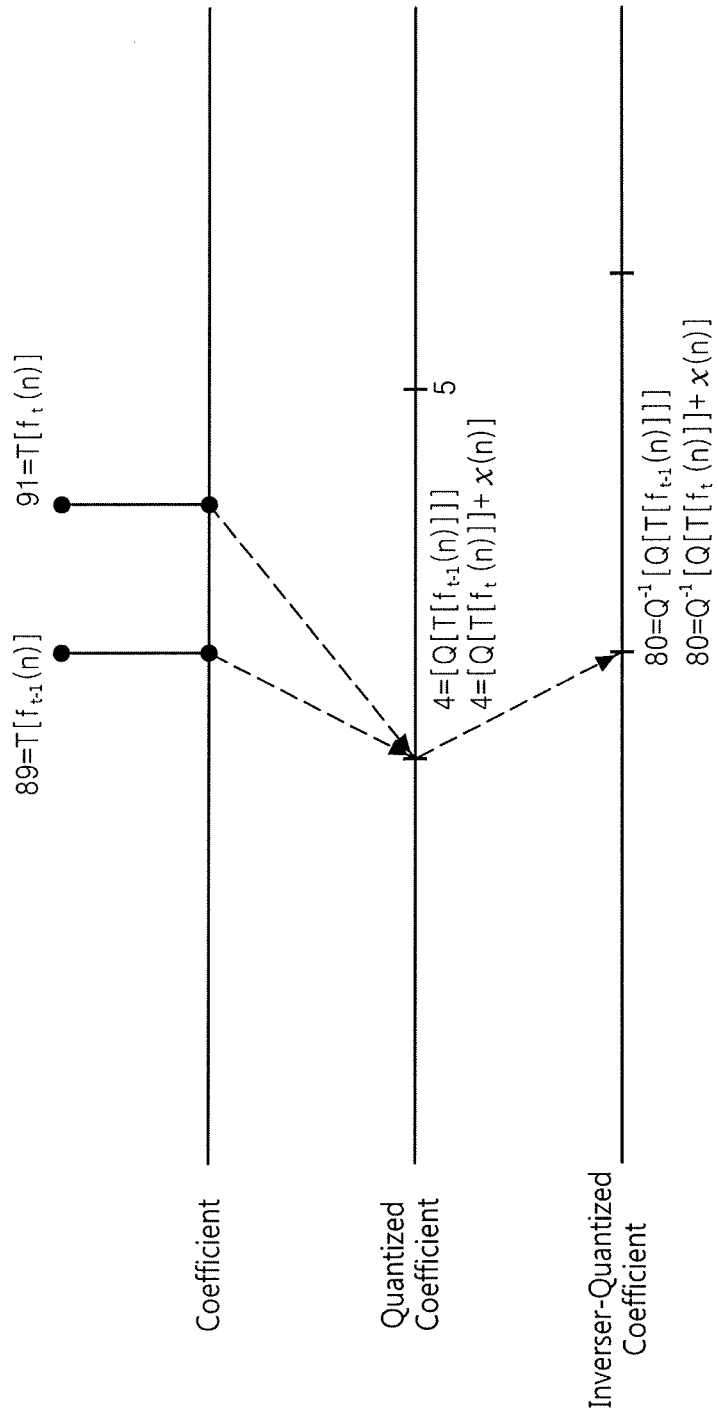
Figure 9:
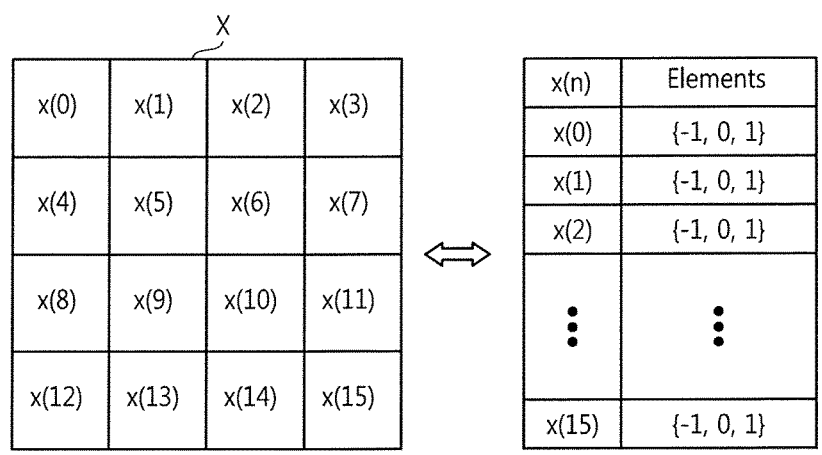
FIG. 9 is a conceptual diagram showing an exemplary embodiment of adjusting coefficients each including a plurality of elements.

FIGS. 7A, 7B and 8 are conceptual diagrams that describe a method of adjusting quantization coefficients to remove or reduce objectionable flickering according to an exemplary embodiment of the present inventive concept, and FIG. 9 is an exemplary embodiment of adjusting coefficients each including a plurality of elements.

Here, it is assumed that the flickering score calculator 235-3 operates or is embodied in the encoder 230A, but the other parameters of the above-described contrary example are maintained including that each of a quantization step size and an inverse-quantization step size is 20, and that the quantizer 235-2 quantizes a frequency domain coefficient according to the rounding off to the nearest integer method or the inclusive and exclusive reckoning and outputs a quantized coefficient.

An operation of the quantization coefficient adjusting block 235 according to the present inventive concept will be described in detail referring to FIGS. 3 to 9.

As shown in FIG. 9, it is assumed that adjusting coefficients (X=x(n)) are represented by a 4*4 matrix, and each of these sixteen adjusting coefficients x(0) to x(15) includes elements {−1, 0, and 1}. It is assumed that initial values of each of the sixteen adjusting coefficients x(0) to x(15) are all set to be "0". Moreover, it is assumed that frequency domain coefficients $T[\hat{f}_{t-1}(n)]$ for the $k^{th}$ block of the reconstructed $(t-1)^{th}$ frame are the same as in the 4*4 matrix BP1.

When values of each of the sixteen adjusting coefficients X=x(0) to x(15) are all "0" and a matrix of the quantized coefficients is BC2, the flickering score E calculated by using the equation of FIG. 4C is 50. The flickering score calculator 235-3 may store the flickering score (E=50) in a memory (not shown). The memory may be embodied inside or outside of the flickering score calculator 235-3.

Next, the exemplary flickering score calculator 235-3 changes the values of each of four adjusting coefficients x(10), x(11), x(14), and x(15) to "−1". When values of each of the four adjusting coefficients x(10), x(11), x(14), and x(15) are all "−1" and a matrix of the original quantized coefficients is BC2, each of the corresponding adjusted quantization coefficients of BC2-1 is 4 as shown in FIG. 7B, and the flickering score E calculated by using the equation of FIG. 4C is 30. The flickering score calculator 235-3 may store the flickering score (E=30) in the memory (not shown).

Next, the flickering score calculator 235-3 changes the values of each of the four adjusting coefficients x(10), x(11), x(14), and x(15) to "+1". When values of each of the four adjusting coefficients x(10), x(11), x(14), and x(15) are all "+1," and a matrix of the original quantized coefficients is BC2, each of adjusted quantization coefficients is 6, and the flickering score E calculated by using the equation of FIG. 4C is 130. The flickering score calculator 235-3 may store the flickering score (E=130) in the memory (not shown).

Thus, the flickering score calculator 235-3 may select adjusting coefficients corresponding to a flickering score E having a minimum value among the flickering scores (e.g., E=50, 30, and 130) stored in the memory. That is, the flickering score calculator 235-3 may change values of each of the four adjusting coefficients x(10), x(11), x(14), and x(15), for example, among the sixteen adjusting coefficients x(0) to x(15) to "−1" to yield BC2-1, which has the relative lowest flickering score E of 30.

Processes of quantizing and inverse-quantizing the sixteenth frequency domain coefficient BP1(15) of 89 for the $k^{th}$ block TK1 of the $(t-1)^{th}$ frame FRAME1 and the sixteenth frequency domain coefficient BC1(15) of 91 for the $k^{th}$ block TK2 of the $t^{th}$ frame FRAME2 will be described in detail referring to FIGS. 4A, 4B, 7A, 7B and 8.

It is assumed that the inverse-quantizer 236 generates an inverse-quantized coefficient by multiplying a quantized coefficient and a quantization step size (e.g., 20). As shown in FIG. 7B, the frequency domain coefficients BC1 are converted to the quantized coefficients BC2, and the quantized coefficients BC2 may be changed to adjusted quantized coefficients BC2-1 using the adjusting coefficients X.

The inverse-quantizer 236 converts the adjusted quantized coefficients BC2-1 to inverse-quantized coefficients BC3-1. Differences between each of the inverse-quantized coefficients BC3-1 for the $t^{th}$ frame FRAME2 and each of the inverse-quantization coefficients BP3 for the $(t-1)^{th}$ frame FRAME1 are all "0". Accordingly, flickering does not occur in the $k^{th}$ block TK2 of the $t^{th}$ frame FRAME2.

Although an exemplary embodiment in which only values of each of the four adjusting coefficients x(10), x(11), x(14), and x(15) are changed from "0" to "−1" is shown in FIGS. 7A and 7B, the flickering score calculator 235-3 may decide independent values of each of the sixteen adjusting coefficients x(0) to x(15) to be one of −1, 0, and 1. For example, the flickering score calculator 235-3 may decide values of each of the sixteen adjusting coefficients x(0) to x(15) to be one of −1, 0, and 1 so as to select a flickering score E having a minimum value.

For example, the $t^{th}$ frame FRAME2 may be an I-frame, and the $t-1^{th}$ frame FRAME1 may be an I-frame or a P-frame.

As shown in FIG. 9, the first adjusting coefficients X selected by the flickering score calculator 235-3 may include at least a portion of second adjusting coefficients. That is, each of the second adjusting coefficients x(0) to x(15) of FIG. 9 may include a plurality of elements (e.g., −1, 0, and 1), and each of the first adjusting coefficients X selected in FIG. 7B may include only one corresponding element among the plurality of elements (e.g., −1, 0, or 1).

Figure 10:
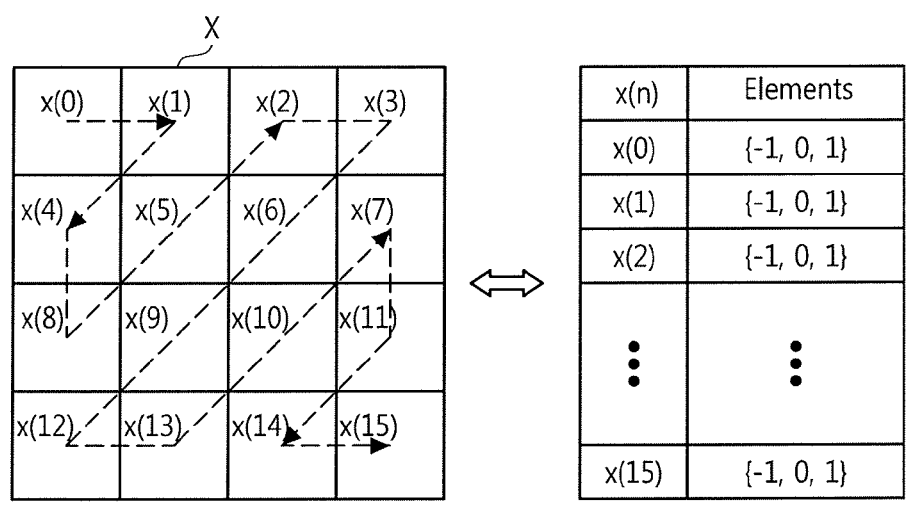
FIG. 10 is a conceptual diagram that describes a method of selecting at least a portion of the adjusting coefficients.

FIG. 10 is a conceptual diagram that describes a method of selecting at least a portion of adjusting coefficients. First, when referring to FIGS. 4C and 9, the flickering score calculator 235-3 may calculate the flickering score E by changing each of the elements (−1, 0, and 1) in an order from a first adjusting coefficient x(0) to a sixteenth adjusting coefficient x(15).

For example, the flickering score calculator 235-3 may first calculate a flickering score E using each of the elements (−1, 0, and 1) of the first adjusting coefficient x(0), and store these calculated flickering scores E in a memory.

Next, the flickering score calculator 235-3 may calculate a flickering score E using each of the elements (−1, 0, and 1) of a second adjusting coefficient x(1), and store these calculated flickering scores E in a memory.

Subsequently, the flickering score calculator 235-3 may calculate a flickering score E using each of the elements (−1, 0, and 1) of a third adjusting coefficient x(2), and store these calculated flickering scores E in a memory. In the same manner as described above, the flickering score calculator 235-3 may calculate a flickering score E using each of the elements (−1, 0, and 1) up to the sixteenth adjusting coefficient x(15), and store its calculated flickering scores E in a memory.

Referring to FIG. 10, the flickering score calculator 235-3 may alternately calculate flickering scores E using each of the elements (−1, 0, and 1) included in each of the adjusting coefficients x(0) to x(15) in a zig-zag direction, and store the calculated flickering scores E in a memory. That is, alternate embodiments may use alternate patterns for sequentially calculating flickering scores and/or calculate some simultaneously.

According to another exemplary embodiment, the flickering score calculator 235-3 may calculate a flickering score E using only elements for some or a sub-set of the sixteen adjusting coefficients x(0) to x(15), and store the calculated flickering scores E in a memory.

That is, according to exemplary embodiments, a method and an order of selecting sixteen adjusting coefficients may be variously changed to calculate the flickering score E. Moreover, a method of selecting some of the sixteen adjusting coefficients and a processing order of the selected adjusting coefficients may be variously changed to calculate the flickering score E.

Figure 11:
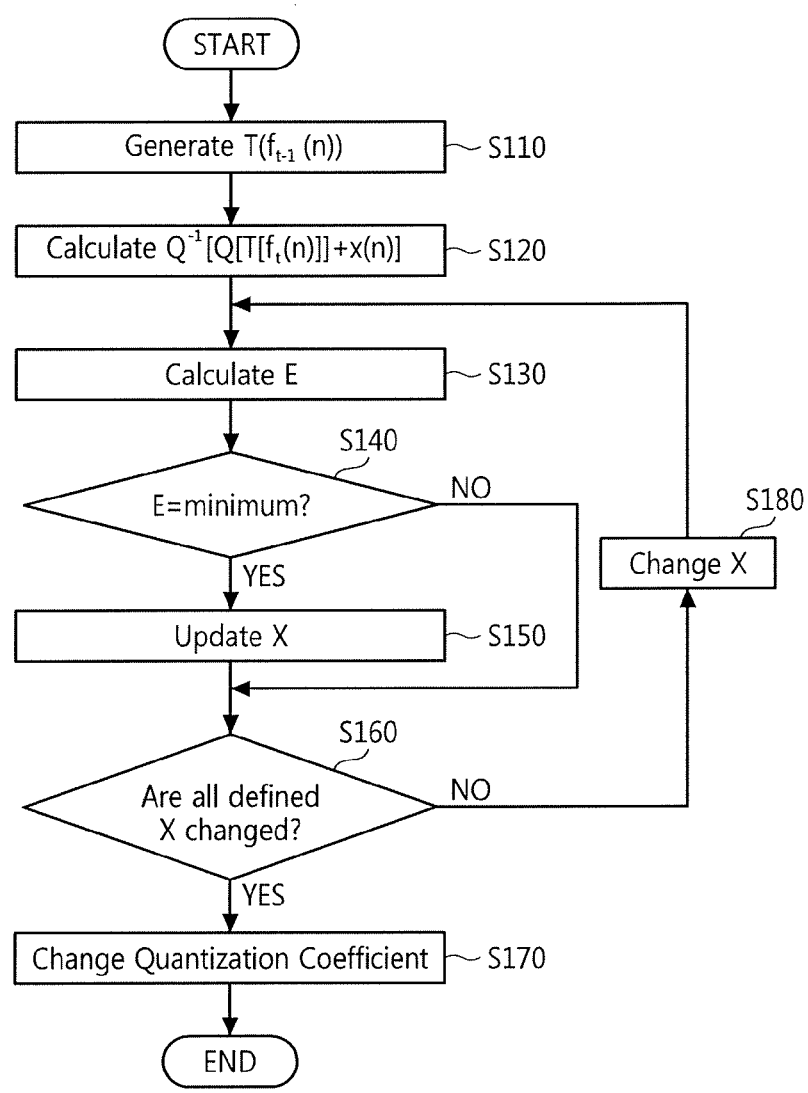
FIG. 11 is a flow-chart diagram, which describes a method of generating adjusting coefficients for removing flickering by using the encoder shown in FIG. 3.

FIG. 11 is a flow-chart diagram that describes a method of generating adjusting coefficients for reducing or removing flickering by using the encoder shown in FIG. 3.

Referring to FIGS. 1 to 11, the transformer 235-1 may receive the $k^{th}$ block of the reconstructed $(t-1)^{th}$ frame, calculate frequency domain coefficients $T[\hat{f}_{t-1}(n)]$ for the $k^{th}$ block and output the calculated frequency domain coefficients $T[\hat{f}_{t-1}(n)]$ to the flickering score calculator 235-3 (S110).

The transformer 235-1 may receive the $k^{th}$ block TK2 of the $t^{th}$ frame FRAME2, and calculate frequency domain coefficient $T[f_t(n)]$ for the $k^{th}$ block TK2. The quantizer 235-2 may quantize the frequency domain coefficient $T[f_t(n)]$ for the $k^{th}$ block TK2 and generate the quantized coefficients $Q[T[f_t(n)]]$.

At this time, the quantizer 235-2 may adjust the quantized coefficients $Q[T[f_t(n)]]$ using adjusting coefficients (X=x(n)) output from the flickering score calculator 235-3.

The inverse-quantizer 236 may inverse-quantize adjusted quantization coefficients $Q[T[f_t(n)]]+x(n)$ to generate inverse-quantized coefficients $Q^{-1}[Q[T[f_t(n)]]+x(n)]$ (S120).

The flickering score calculator 235-3 may calculate the flickering score E using each of the elements (−1, 0, and 1) of each of the adjusting coefficients X and the equation of FIG. 4C (S130).

The flickering score calculator 235-3 may determine whether or not the calculated flickering score E is a new minimum (S140). When the calculated flickering score E is a minimum (Yes of S140), the flickering score calculator 235-3 may update each of the adjusting coefficients X (S150). However, when the calculated flickering score E is not a minimum (NO at step S140), the flickering score calculator 235-3 may perform S160 next.

The flickering score calculator 235-3 may determine whether or not each adjusting coefficient of X that is defined has been changed regardless of whether it has ultimately been changed back (S160). All adjusting coefficients X that are defined may be all or some of the adjusting coefficients X, and an order of changing the all or the some adjusting coefficients may be decided by the flickering score calculator 235-3.

When all adjusting coefficients X that are defined have been changed (YES of S160), the flickering score calculator 235-3 may output the updated adjusting coefficients X to the quantizer 235-2. Accordingly, the quantizer 235-2 may adjust or change quantized coefficients for the $k^{th}$ block TK2 of the $t^{th}$ frame FRAME2 using the updated adjusting coefficients X (S170).

When less than all adjusting coefficients X that are defined have been changed (NO at step S160), the flickering score calculator 235-3 may change at least one of the elements of one of the adjusting coefficients X that are defined, and perform S130 using the adjusting coefficient having a changed element.

The quantizer 235-2 may output quantized coefficients QC that are changed to the inverse-quantizer 236. The inverse-quantizer 236 may inverse-quantize the quantized coefficients QC that are changed, and output the inverse-quantized coefficients IQC to the inverse-transformer 237. The inverse-transformer 237 may transform the inverse-quantized coefficients IQC to spatial domain values. For example, the inverse-transformer 237 may transform the inverse-quantized coefficients IQC to spatial domain values using an inverse discrete cosine transform (IDCT).

The adder 239 may generate a reconstructed block RBL by adding values output from the inverse-transformer 237 and spatial-domain prediction block values of a spatial-domain prediction block PBL output from the mode decision block 233. The reconstructed block RBL may include reconstructed block values. The reconstructed block RBL may be transmitted to a de-blocking filter 241 and simultaneously to an intra prediction block 251.

The de-blocking filter 241 may perform a de-blocking operation on the reconstructed block RBL generated by the adder 239. The sample adaptive offset (SAO) filter 243 may perform SAO filtering on a block de-blocked by the de-blocking filter 241.

The frame buffer 245 may receive and store a SAO filtered block FBL output from the SAO filter 243. The SAO filtered block FBL may include SAO filtered block values. The frame buffer 245 may store the $(t-1)^{th}$ frame as a reference frame.

The motion prediction block 247 may receive an IFR spatial-domain current block, and process a current frame, e.g., the $t^{th}$ frame, on a block basis referring to a previous frame, e.g., the $(t-1)^{th}$ frame, stored in the frame buffer 245. For example, the motion prediction block 247 may transmit positional information PI on a block best matched to an IFR spatial-domain current block among blocks included in the $(t-1)^{th}$ frame stored in the frame buffer 245 to the motion compensation block 249.

The motion compensation block 249 may receive the positional information PI, read a block corresponding to the positional information PI from the frame buffer 245, and transmit the read block to the mode decision block 233 as a second prediction block EBL2. Accordingly, the second prediction block EBL2 may be a block predicted with reference to the $(t-1)^{th}$ frame.

The intra prediction block 251 may receive the IFR spatial-domain current block and the reconstructed block RBL, and transmit a block predicted using the reconstructed block RBL to the mode decision block 233 as a first prediction block EBL1. Accordingly, the first prediction block EBL1 may be a block predicted using a block encoded in advance in the same frame.

The entropy encoder 253 may encode quantized coefficients QC output from the quantizer 235-2, and output an encoded bit-stream (EBS).

As described referring to FIGS. 1 to 11, the encoder 230A may reduce flicker occurring in the display 500. The transformer 235-1 may generate first frequency domain coefficients $T[f_t(n)]$ for the $k^{th}$ block values RESIDUAL of a current frame. The quantizer 235-2 may quantize the first frequency domain coefficients $T[f_t(n)]$ and generate quantized coefficients $Q[T[f_t(n)]]$. The coefficient calculator 235-3 may generate first adjusting coefficients X to reduce flicker. The quantizer 235-2 may adjust quantization coefficients $Q[T[f_t(n)]]$ using the first adjusting coefficients X and output adjusted quantization coefficients $Q[T[f_t(n)]]+x(n)$.

The encoder 230A may further include the inverse-quantizer 236 connected to the quantizer 235-2. The transformer 235-1 may calculate second frequency domain coefficients $T[\hat{f}_{t-1}(n)]$ for $k^{th}$ block values of a reconstructed previous frame output from the frame buffer 245. The inverse-quantizer 236 may inverse-quantize the adjusted quantization coefficients $Q[T[f_t(n)]]+x(n)$ to generate inverse-quantized coefficients $Q^{-1}[Q[T[f_t(n)]]+x(n)]$. The coefficient calculator 235-3 may change at least one of the first adjusting coefficients X using the inverse-quantized coefficients $Q^{-1}[Q[T[f_t(n)]]+x(n)]$ and the second frequency domain coefficients $T[\hat{f}_{t-1}(n)]$.

Figure 12:
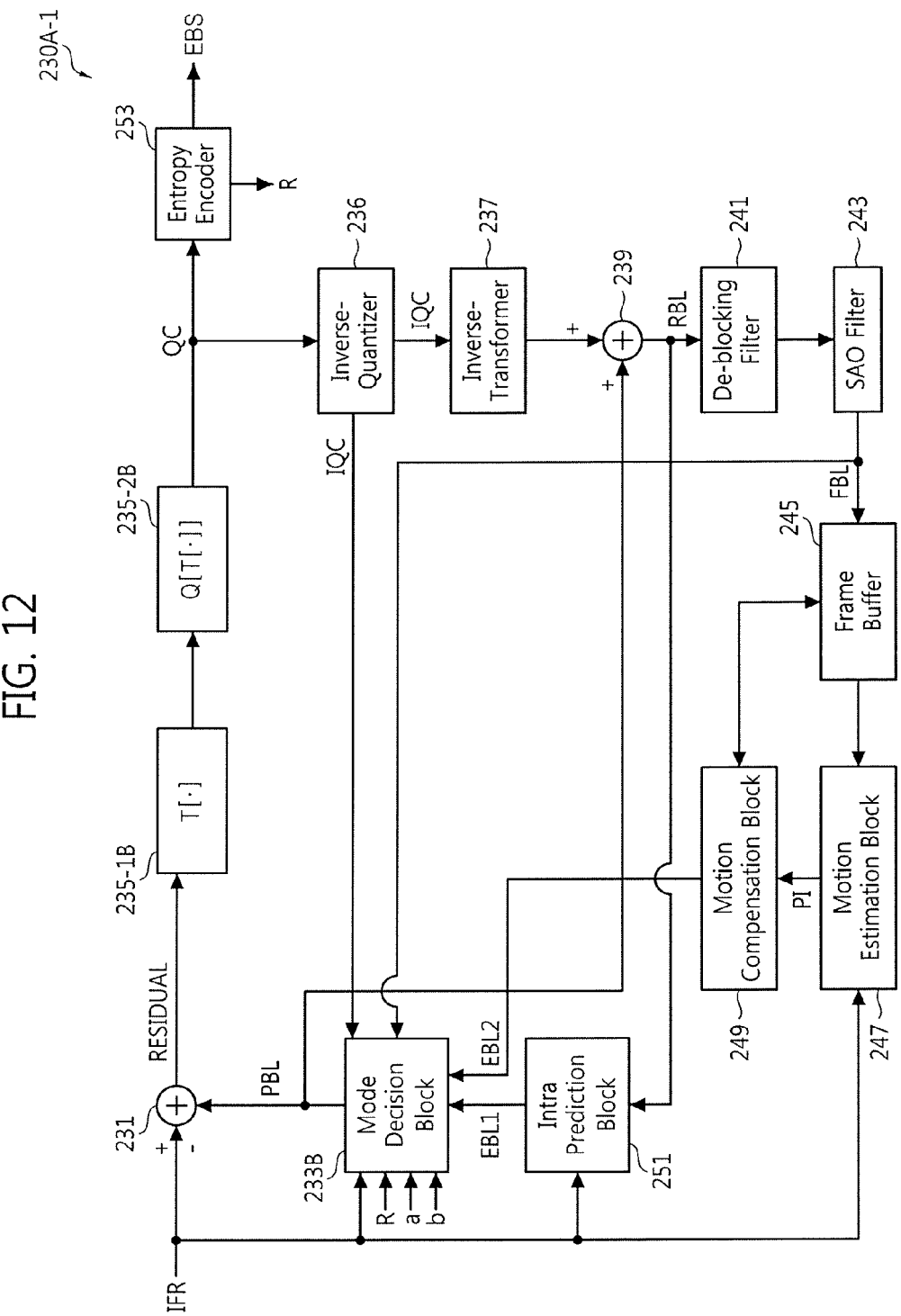
FIG. 12 is a schematic block diagram of an encoder, shown generally in FIG. 2, according to another exemplary embodiment of the present inventive concept.

FIG. 12 is a schematic block diagram of an alternate encoder shown generally in FIG. 2 according to another exemplary embodiment of the present inventive concept. Elements substantially different from the encoder of FIG. 3 may be indicated with a different suffix, but need not be. Referring to FIG. 12, an encoder 230A-1 may include the subtractor 231 configured to receive at least a portion of an input frame (IFR) signal on a non-inverting input, a mode decision block 233B configured to receive the IFR signal as well as inputs "R", "a" and "b", and connected to an inverting input of the subtractor, a transformer 235-1B connected to an output of the subtractor, a quantizer 235-2B connected to an output of the transformer, the inverse-quantizer 236 connected to an output of the quantizer, the inverse-transformer 237 connected to an output of the inverse-quantizer, the adder 239 connected to an output of the inverse-transformer, the de-blocking filter 241 connected to an output of the adder 239, the SAO filter 243 connected to an output of the de-blocking filter, the frame buffer 245 connected to an output of the SAO filter, the motion estimation block 247 connected to an output of the frame buffer, the motion compensation block 249 connected to an output of the motion estimation block, the intra prediction block 251 connected to an output of the adder, and an entropy encoder 253 connected to an output of the quantizer 235-2B and configured to output the signal "R" to the mode decision block 233B as well as to output an encoded bit-stream (EBS).

The mode decision block 233B may select a spatial-domain prediction block PBL using Equation 1.

$$J=D+aR+bE$$

Here, J is a LaGrangian cost function or a function value that is adapted to optimize rate-distortion according to an exemplary embodiment of the present inventive concept, D represents distortion between spatial-domain current block values of the IFR spatial-domain current block and reconstructed block values of the reconstructed block RBL, R represents an encoded bit-stream R=BS, "a" represents a LaGrange constant of the encoded bit-stream, E represents the flickering score E shown in FIG. 4C, and b represents a LaGrange constant for the flickering score E. For example, when the flickering score E is an important issue, b may be set to a relatively large value, and when the distortion D is an important issue, b may be set to a relatively small value.

The equation shown in FIG. 4C is an equation that calculates adjusting coefficients X by minimizing the flickering score E, and Equation 1, above, is an equation that calculates adjusting coefficients X by minimizing a combination score J responsive to both distortion and flickering. For example, the adjusting coefficients X minimizing the flickering score E and the adjusting coefficients X minimizing J may be different from each other.

The mode decision block 233B may calculate a function J or a value J using spatial-domain current block values of the IFR spatial-domain current block, reconstructed block values of the reconstructed block RBL, inverse-quantized coefficients IQC, an encoded bit-stream R, constants a and b, a first prediction block EBL1, and a second prediction block EBL2, and output a spatial-domain prediction block PBL corresponding to a result of the calculation.

Figure 13:
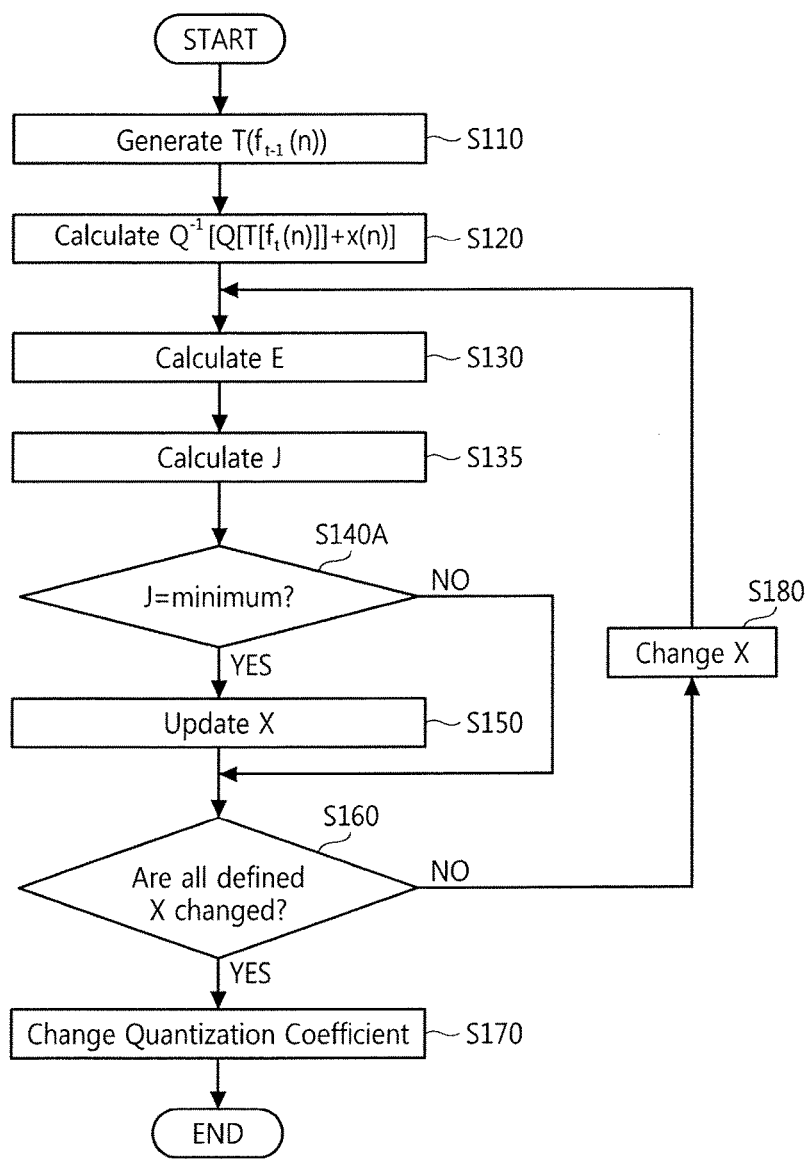
FIG. 13 is a flow-chart diagram, which describes an operation of the encoder shown in FIG. 12.

FIG. 13 is a flow-chart that describes an operation of the encoder shown in FIG. 12. The mode decision block 233B of FIG. 12 may include a quantization coefficient adjusting block 235, which can calculate a flickering score E and a J calculation block (not shown), to calculate a deformed LaGrangian cost function value (J).

The alternate embodiment of FIGS. 12 and 13 is similar in certain respects to that of FIGS. 3 and 11. Referring back to FIGS. 1 to 4C, and 7 to 9, the transformer 235-1 of FIG. 3 may receive the $k^{th}$ block of the reconstructed $(t-1)^{th}$ frame, calculate the frequency domain coefficients $T[\hat{f}_{t-1}(n)]$ for the $k^{th}$ block, and output the calculated frequency domain coefficients $T[\hat{f}_{t-1}(n)]$ to the flickering score calculator 235-3 (S110).

The transformer 235-1 may receive the $k^{th}$ block TK2 of the $t^{th}$ frame FRAME2, and calculate the frequency domain coefficients $T[f_t(n)]$ for the $k^{th}$ block TK2. The quantizer 235-2 may quantize the frequency domain coefficients $T[f_t(n)]$ for the $k^{th}$ block TK2 to generate the quantized coefficients $Q[T[f_t(n)]]$.

At this time, the quantizer 235-2 may adjust the quantized coefficients $Q[T[f_t(n)]]$ using adjusting coefficients X=x(n) output from the flickering score calculator 235-3.

The inverse-quantizer 236 may inverse-quantize the adjusted quantization coefficients $Q[T[f_t(n)]]+x(n)$ and generate inverse-quantized coefficients $Q^{-1}[Q[T[f_t(n)]]+x(n)]$ (S120).

The flickering score calculator 235-3 may calculate a flickering score E with the equation of FIG. 4C using each of the elements of each of the adjusting coefficients (S130).

Turning now to FIGS. 12 and 13, duplicate description may be omitted. A J calculation block of the mode decision block 233B may calculate the LaGrangian cost function value J using Equation 1 (S135).

The J calculation block may determine whether the calculated function value J is a new minimum (S140A). When the calculated function value J is a minimum (YES at step S140A), the flickering score calculator 235-3 may update the adjusting coefficients X according to a control of the J calculation block (S150). However, when the calculated function value J is not a minimum (NO at step S140A), the flickering score calculator 235-3 may perform S160 according to a control of the J calculation block.

The mode decision block 233B may determine whether or not all defined adjusting coefficients X have been changed regardless of whether such changes were kept (S160). All defined adjusting coefficients X may be all or some of the adjusting coefficients X, and a changing order of the all or the some adjusting coefficients may be decided by the mode decision block 233B.

When all of the defined adjusting coefficients X are changed (YES at step S160), the mode decision block 233B may direct updated adjusting coefficients X to the quantizer 235-2B. Accordingly, the quantizer 235-2B may produce quantized coefficients for the $k^{th}$ block TK2 of the $t^{th}$ frame FRAME2 using the updated adjusting coefficients X (S170).

When all of the defined adjusting coefficients X are not changed (NO at step S160), the mode mode decision block 233B may change to at least one of the elements of one of the defined adjusting coefficients X, and perform S130 using the adjusting coefficient having a changed element. For example, values necessary for a calculation of a flickering score E may be input to the mode decision block 233B.

Thus, encoders according to exemplary embodiments of the present inventive concept may remove flickering that occurs in a current frame using information from a previous frame and information from the current frame.

Although illustrative embodiments of the present general inventive concept have been shown and described with reference to the accompanying drawings, it will be appreciated by those skilled in the art that the present inventive concept is not limited to those precise embodiments, and that various changes and modifications may be made by those of ordinary skill in the pertinent art without departing from the principles and spirit of the general inventive concept, the scope of which is defined in the appended claims and their equivalents.

What is claimed is:

1. An application processor having an encoder for reducing flicker on a display, the encoder comprising:
   a transformer configured to generate first frequency domain coefficients for individual block values of a current frame;
   a quantizer connected to the transformer and configured to quantize the first frequency domain coefficients and generate quantized coefficients; and
   a coefficient calculator connected to the transformer and configured to generate first adjusting coefficients for reducing the flicker using the first frequency domain coefficients,
   wherein the quantizer is connected to the coefficient calculator and configured to adjust the quantization coefficients based on the first adjusting coefficients, and output the adjusted quantization coefficients.

2. The application processor of claim 1, the encoder further comprising an inverse-quantizer connected to the quantizer, wherein:
   the transformer is configured to calculate second frequency domain coefficients for individual block values of a reconstructed previous frame;
   the inverse-quantizer is configured to inverse-quantize the adjusted quantization coefficients to generate inverse-quantized coefficients, and
   the coefficient calculator is connected to the inverse-quantizer and configured to adapt at least one of the first adjusting coefficients based on the inverse-quantized coefficients and the second frequency domain coefficients.

3. The application processor of claim 2, wherein the current frame is a first I-frame, a previous frame related to the reconstructed previous frame is one of a second I-frame and a P-frame, and the individual block values are values for the $k^{th}$ block of the current and reconstructed previous frames, respectively.

4. The application processor of claim 2, wherein the coefficient calculator is configured to change at least one of the first adjusting coefficients so as to minimize an absolute value of a sum of differences between each of the inverse-quantized coefficients and each of the second frequency domain coefficients.

5. The application processor of claim 1, wherein the first adjusting coefficients include at least a portion of second adjusting coefficients, each of the second adjusting coefficients includes a plurality of elements, and each of the first adjusting coefficients includes a corresponding one of the plurality of elements.

6. The application processor of claim 5, wherein the coefficient calculator is configured to generate at least a portion of the second adjusting coefficients for the first adjusting coefficients using a zig-zag scanning method.

7. A data processing system comprising a display and an application processor configured to control the display, the application processor comprising an encoder configured to reduce flicker occurring in the display, the encoder comprising:
   a transformer configured to generate first frequency domain coefficients for individual block values of a current frame;
   a quantizer connected to the transformer and configured to quantize the first frequency domain coefficients to generate quantized coefficients; and
   a coefficient calculator connected to the transformer and configured to generate first adjusting coefficients for reducing the flicker,
   wherein the quantizer is connected to the coefficient calculator and configured to adjust the quantization coefficients based on the first adjusting coefficients and output adjusted quantization coefficients, and
   wherein the first adjusting coefficients include at least a portion of second adjusting coefficients, each of the second adjusting coefficients includes a plurality of elements, and each of the first adjusting coefficients includes a corresponding one of the plurality elements.

8. The data processing system of claim 7, the encoder further comprising an inverse-quantizer connected to the quantizer, wherein:
   the transformer is configured to calculate second frequency domain coefficients for individual block values of a reconstructed previous frame;
   the inverse-quantizer is configured to inverse-quantize the adjusted quantization coefficients to generate inverse-quantized coefficients, and
   the coefficient calculator is connected to the inverse-quantizer and configured to adapt at least one of the first adjusting coefficients based on the inverse-quantized coefficients and the second frequency domain coefficients.

9. The data processing system of claim 8, wherein the current frame is a first I-frame, a previous frame related to the reconstructed previous frame is one of a second I-frame and a P-frame, and the individual block values are values for the $k^{th}$ block of the current and reconstructed previous frames, respectively.

10. The data processing system of claim 8, wherein the coefficient calculator is configured to change at least one of the first adjusting coefficients so as to minimize an absolute value of a sum of differences between each of the inverse-quantized coefficients and each of the second frequency domain coefficients.

11. The data processing system of claim 7, wherein the coefficient calculator is configured to generate at least a portion of the second adjusting coefficients for the first adjusting coefficients using a zig-zag scanning method.

12. The data processing system of claim 7, further comprising:
   an imaging device connected to the application processor;
   a first serial interface connected between the application processor and the imaging device; and
   a second serial interface connected between the application processor and the display.

13. The data processing system of claim 12, wherein the first serial interface is a mobile industry processor interface (MIPI®) camera serial interface (CSI), and the second serial interface is MIPI® display serial interface (DSI).

14. The data processing system of claim 13, further comprising a memory connected to the application processor,
   wherein the application processor and the memory are packaged in a package on package (PoP) or a system-in-package (SiP).

15. An application processor having an encoder for reducing flicker on a display, the encoder comprising:

a transformer configured to generate first frequency domain coefficients for individual blocks of a current frame;

a quantizer connected to the transformer and configured to quantize the frequency domain coefficients and generate quantized coefficients;

an inverse-quantizer connected to the quantizer and configured generate inverse-quantized coefficients using the quantized coefficients; and a mode decision unit connected to the inverse-quantizer and configured to select spatial-domain prediction blocks based on a cost function to optimize rate-distortion, wherein the transformer is connected to the mode decision unit and configured to calculate second frequency domain coefficients for reconstructed previous blocks responsive to the selected spatial-domain prediction blocks to reduce flicker, and wherein the cost function is calculated using the inverse-quantized coefficients.

16. The application processor of claim 15, the mode decision unit comprising:

a quantization coefficient adjusting unit configured to calculate a flickering score value; and a calculation unit configured to calculate a cost function value.

17. The application processor of claim 15, wherein the current frame is a first 1-frame, a previous frame related to the reconstructed previous frame is one of a second I-frame or a P-frame, and the individual blocks are the $k^{th}$ blocks of the current and reconstructed previous frames, respectively.

18. The application processor of claim 15, wherein the mode decision unit is configured to select spatial-domain prediction blocks to minimize an absolute value of a sum of differences between the inverse-quantized coefficients and the second frequency domain coefficients.

19. The application processor of claim 15, wherein the mode decision unit is configured to select spatial-domain prediction blocks based on a LaGrangian cost function.

* * * * *